United States Patent [19]

Muller

[11] 4,039,747
[45] Aug. 2, 1977

[54] APPARATUS FOR CONVERTING THE POSITION OF A MANUALLY OPERATED INSTRUMENT INTO AN ELECTRICAL SIGNAL

[75] Inventor: Alex M. Muller, Palos Verdes, Calif.

[73] Assignee: Telautograph Corporation, Los Angeles, Calif.

[21] Appl. No.: 655,430

[22] Filed: Feb. 5, 1976

[51] Int. Cl.² .............................................. G08C 21/00
[52] U.S. Cl. ................................................... 178/19
[58] Field of Search ......................................... 178/19

[56] References Cited

U.S. PATENT DOCUMENTS

| | | | |
|---|---|---|---|
| 3,539,995 | 11/1970 | Brandt | 178/19 X |
| 3,846,580 | 11/1974 | Brenner | 178/19 |
| 3,851,097 | 11/1974 | Rodgers | 178/19 |
| 3,904,822 | 9/1975 | Kamm et al. | 178/19 |

Primary Examiner—Thomas A. Robinson
Attorney, Agent, or Firm—Lindenberg, Freilich

[57] ABSTRACT

An improved apparatus capable of converting the position of a pen-type sensor relative to the surface of a writing table into an electrical signal representative of such position and which may be utilized for control, data input or transmission purposes. The writing table includes two sets of independent, spaced-apart conducting wires which form a grid throughout the writing area. The conducting wires are individually and discretely pulsed sequentially to generate a time varying electrostatic field adjacent to the writing table that can be sensed by the sensor. The signal sensed by the sensor and the signals used to drive the time-varying electrostatic field are electronically processed and converted into electrical signals representing the position of the sensor relative to the writing table.

12 Claims, 2 Drawing Figures

4,039,747

APPARATUS FOR CONVERTING THE POSITION OF A MANUALLY OPERATED INSTRUMENT INTO AN ELECTRICAL SIGNAL

FIELD OF THE INVENTION

This invention relates to the field of position sensors and in particular to apparatus for converting the position of a writing instrument relative to a writing table into an electrical signal.

PRIOR ART

Various techniques have been employed for generating electrical signals which reflect the position of a manually held writing instrument. Early embodiments used articulated arms attached to the writing implement to determine its position or movement in the plane of the writing surface. The position of the arms was converted through electrically sensitive means into electrical signals.

Position signal generation can also be accomplished by using a "light pen" on a cathode ray display tube. The light pen contains a photocell, which as it is held close to the display tube, provides a signal corresponding to the time at which the scanning beam of the tube hits the light pen. This time signal can then be converted into position signals corresponding to the X and Y coordinates of the position of the pen relative to the tube.

Another means of sensing the position of a writing instrument utilizes a conductive tablet in which d-c fields are established. A conducting stylus contacting the tablet surface would bear an electric potential corresponding to its position on the table. This requires a metal, non-writing stylus and provides less accuracy and resolution than is desired.

U.S. Pat. No. 3,530,241 describes a system wherein a conductive sheet of high resistivity is employed as the writing table. Means are provided for establishing electrical fields in the sheet in orthogonal directions during mutually exclusive time intervals. The stylus senses the generated electrostatic field by capacitive coupling and the amplitude and time of the sensed signal can be converted into signals corresponding to the X and Y position of the stylus. This system, however, has poor resolution of the generated position information because the conductivity of the sheet is not uniform.

In subsequent developments, other techniques have been employed as position sensing apparatus. Accoustical, optical and pressure transducers have been used. Among the more sophisticated devices are those in which the position of the writing instrument is sensed and two electrical signals are generated corresponding to the two dimensions of the position of the writing instrument. Those signals are then used to modulate two different carrier frequencies that can be superimposed and transmitted, for example, over a standard telephone circuit. Frequency modulation has the advantage over amplitude modulation in this application because frequency modulated signals are subject to fewer inaccuracies introduced during the transmission.

A method that employs a system of parallel conducting wires embedded in the writing tablet is described in U.S. Pat. No. 3,767,858. In that disclosure the parallel conducting wires are connected together sequentially by resistors and two electrical signals of the same frequency but of different phase are applied to the two outermost parallel wires. This sets up an alternating electrostatic field adjacent to the tablet surface which has that same frequency and whose phase shift varies according to the position in the dimension perpendicular to the parallel conducting wires. The pen senses the electrostatic field according to its position in this dimension and the signal from the pen controls a phase locked loop circuit where the phase of the pen signal is converted into a frequency modulation of the given signal frequency. A separate system of parallel conducting wires are embedded essentially perpendicular to the first set and are also connected sequentially by resistors but are independent of the first set. The outermost wires of this second set are electrically driven analagously to the first set of wires but at a substantially different frequency than that of the first set. The pen senses the superimposed electrostatic field components which are separated in to X and Y information by the use of bandpass filters.

This method, however, requires an extremely accurate determination of the phase angle of a varying signal. This is especially difficult where the signal that is sensed is composed of two different frequencies that must be separated by filters prior to the determination of their phase angles. The resolution of the resulting position signal is inherently limited by the analog means of applying the superimposed varying electrostatic fields to the writing tablet such that the phase angles of the fields vary linearly with position and by the analog means of interpreting the phase angles of the superimposed sensed signals to determine the position of the sensor.

Accordingly, it is a general object of the invention to provide an improved system for converting the position of a writing instrument into electrical signals that can be used for transmission, control, recording or data input purposes.

It is another object of this invention to provide an apparatus that will determine the position of a writing instrument and encode electrical signals that represent that position to a high degree of accuracy.

It is a further object of the present invention to provide a method for determining and encoding the position of a writing instrument in a manner that is convenient to the operator and requires a minimum of operator instructions.

SUMMARY OF THE INVENTION

The present invention relates to apparatus used to determine the position of a writing instrument relative to a writing surface by setting up a varying electrostatic field using digital electronic circuitry. A writing table contains a grid of spaced-apart conducting wires parallel to the surface of the writing surface with none of the conducting wires being connected to any other conducting wire. An electronic oscillating circuit is used to step an electronic digital counting circuit continuously and repetitively, the number of states of the counter being at least as great as the total number of conducting wires. Digital gating circuitry is employed to gate a voltage pulse to the individual conducting wires, each for a unique state of the counter, such that the wires are pulsed sequentially according to their positions with respect to the writing table. These pulses set up a varying electrostatic field adjacent to the writing surface which is sensed by a writing instrument incorporating a sensor. The signal sensed by the sensor incorporated in the writing instrument is electronically converted to signals that provide information as to the X and Y position of the writing pen.

The novel features which are believed to be characteristic of the invention, both as to its organization and its method of operation, together with further objects and advantages thereof, will be better understood from the following description in connection with the accompanying drawings in which a presently preferred embodiment of the invention is illustrated by way of example. It is to be expressly understood, however, that the drawings are for purposes of illustration and description only and are not intended as a definition of the limits of the invention.

DETAILED DESCRIPTION OF THE INVENTION

Figure 1:
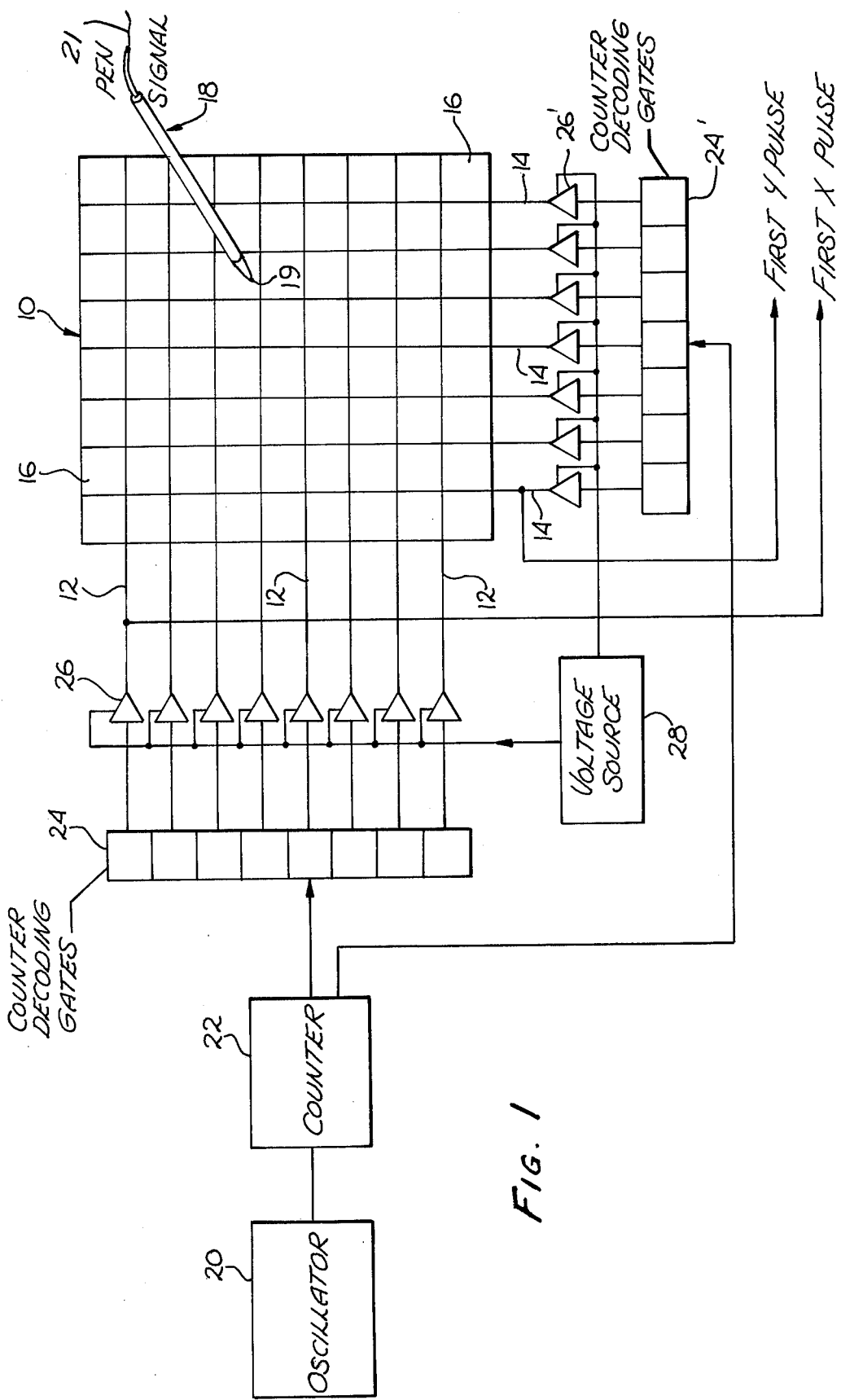
FIG. 1 is a system block diagram of the invention.

In FIG. 1 a writing table 10 is illustrated which has a grid of conducting wires parallel to the writing surface consisting of a first set of spaced-apart X wires 12 and a second set of spaced-apart Y wires 14 running at right angles to the wires 12. It will be understood that the wires 12 and 14 are not connected to one another where they cross inasmuch as they are slightly separated by insulating material. A thin rigid writing surface 16 overlays the grid consisting of wires 12 and 14. The writing surface 16 is used to support writing material such as blank, lined, or graphed paper or a preprinted form upon which a writing pen 18 may be used. It will be seen that it is not essential that the two sets of wires run at right angles to each other as long as they form a grid throughout the writing area.

A pulse generator 20, such as oscillator circuit, generates voltage pulses at a rate, for example, of 200,000 pulses per second. The output of the pulse generator 20 is coupled to the input of an electronic digital counting circuit 22 which counts in a binary fashion to a number of at least as great as the total number of the conducting wires 12 and 14. The counting circuit 22 is stepped by the pulses from the pulse generator 20 and counts in a circular or repetitive manner such that it never stops during the operation of the apparatus.

The state of the counter at any given time is reflected by the voltage state of the digital output signals from the counting circuit 22 in binary number formation. These binary output signals are coupled to gating circuitry 24 and 24' where they are decoded into separate gate signals corresponding to unique states of the counter. These gate signals are amplified by a set of amplifiers 26, one amplifier for each gate or decoded count signal. The amplifiers 26 are powered by a voltage source 28.

When the apparatus is in operation the amplifiers 26 are each generating a voltage pulse output for one particular state of the counter 22 which occurs repetitively once each time the counter 22 steps through its count cycle.

The outputs of the various amplifiers 26 are electrically connected on a one-to-one basis to the X and Y wires 12 and 14 in such a manner that the first amplifier 26 to pulse in the count cycle is connected to the conducting wire of the X wires 12 which is at the extreme edge of the writing surface 16, the amplifier 16 that pulses at the following count of the counter 22 is connected to the X wire immediately adjacent to the preceding wire, and continuing such that the X wires 12 are each connected to individual amplifiers so that they will receive voltage pulses sequentially and consecutively according to their positions in the writing table. The consecutively pulsed X wires 12 cause a varying electrostatic field to be set up adjacent to the writing table 10 that has the effect of sweeping across the table 10 in a direction at right angles to the X wires 12 each time that the counter 22 steps through its count cycle.

Similarly, the Y wires 14 are connected to amplifiers 26', gating circuitry 24' and counter circuit 22 such that, analogously, they are pulsed consecutively according to their positions relative the writing table 10. The consecutively pulsed Y wires 14 cause a varying electrostatic field to be set up adjacent to the writing table 10 that has the effect of sweeping across the table 10 in a direction at right angles to the Y wires 14. The Y wires are consecutively pulsed during a different part of the count cycle than when the X wires 12 are consecutively pulsed so that the varying electrostatic field has the effect of alternatively and repetitively sweeping first at right angles to the X wires then at right angles to the Y wires, then again at right angles to the X wires, continuously.

The pen point 19 of the writing pen 18 acts as a pickup element for an electrostatic field sensor within the pen 18. The pen 18 may also incorporate a pre-amplifier to achieve improved signal-to-noise characteristics. The signal sensed by the pen point 19 is coupled by a cable 21 from the pen 18 to the processing circuitry.

Figure 2:
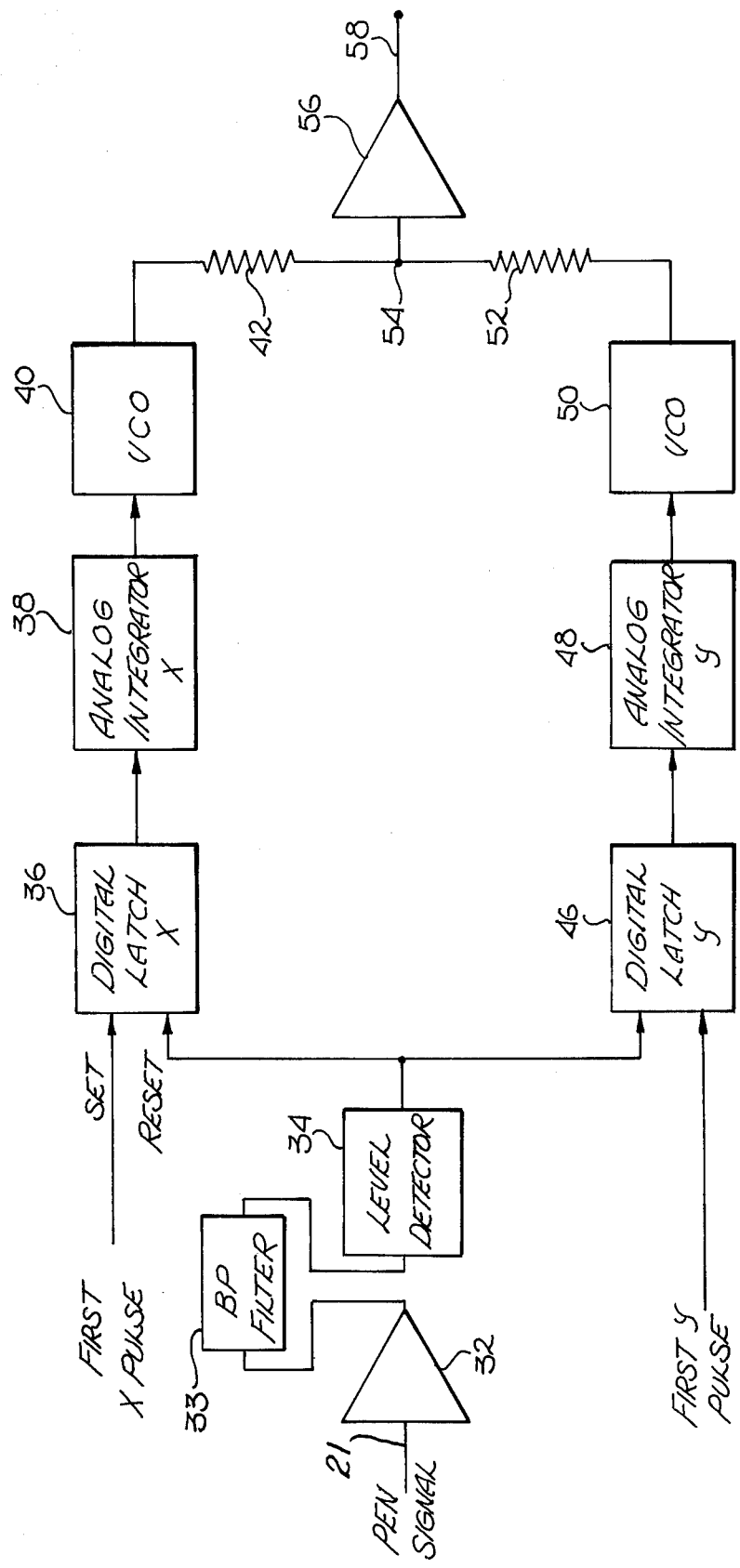
FIG. 2 illustrates a system block diagram of one embodiment of a signal processor in which the signal sensed by the pen is translated to positional information suitable for transmission.

FIG. 2 shows a block diagram of a preferred embodiment of the processing circuitry. The signal sensed by the pen 18 is coupled to the input of an AGC amplifier 32. The output of the amplifier 32 is connected to the input of a bandpass filter 33 which rejects low frequencies detected by amplifier 32 and integrates steps caused by any sharp rise and fall times of X and Y pulses. The output of bandpass filter 33 is, then, connected to a level detecting circuit 34 that generates a short uniform pulse at the time when its input signal reaches a determined amplitude level.

A digital latch circuit 36 is set by the same voltage that pulses the first of the X wires 12 and is reset by the output pulses from the detector 34. Therefore, the latch circuit 36 is set for a time duration measured from the time of the pulse of the first of the X wires 12 until the pen 18 senses a peak in the electrostatic field. The time duration that the latch circuit 36 is set is therefore a measure of the position of the pen 18 in the dimension at right angles to the X wires 12.

The output of the digital latch circuit 36 is coupled to the input of an analog integration circuit 38. The signal from the latch circuit 36 is integrated with respect to time and an analog voltage is generated that is proportional to the time duration that the latch circuit 36 is set and therefore is a measure of the position of the pen 18 in the dimension at right angles to the X wires 12. The analog integration circuit 38 has a slow time response in comparison with the period of the digital counter circuit 22 which repetitively drives the electrostatic field. Therefore, if occasional noise or other interferences produces an erroneous output from the peak detector circuit 34, the slow time response of the integrating circuit 38 has the effect of smoothing out these errors and causes the integrating circuit 38 to act as a low pass filter.

Similarly, digital latch circuit 46 is set by the first pulse to the Y wires 14 and reset by the same peak detector circuit 34. The output of the digital latch circuit 46 is a digital signal whose duration is a measure of the position of the pen 18 in the dimension at right angles to the Y wires 14. The output of the latch circuit 46 is coupled to the input of an analog integration circuit 48 which generates an analog voltage that is a measure of the position of the pen 18 in the dimension at right angles to the Y wires 14. Thus the invention provides electrical signals at the output of the integrator circuits 38 and 48, which represent the position of the writing pen in two dimensions of the writing table surface respectively.

If desired, the pen position information can be coupled to remote apparatus over a single channel such as a conventional telephone circuit. In order to achieve this, the X and Y position signals are transformed in to frequency-modulated signals with different carrier frequencies. As shown in FIG. 2, the outputs of the analog integrating circuits 38 and 48 are coupled respectively to the inputs of two voltage controlled oscillator circuits 40 and 50 which each produce an alternating signal output whose frequency is modified by the voltage at its input. The center or carrier frequency of each oscillator circuit 40 and 50 is chosen to be dissimilar, from that of the other. These two signals of dissimilar frequencies can be superimposed through resistors 42 and 52 at node 54. The combined signal at node 54 is coupled to the input of a line amplifier circuit 56 which is connected to a telephone line 58. The two superimposed frequencies transmitted by the telephone line 58 contain the information of the position of the pen in the two dimensions as embodied in the frequency variations of the two different superimposed frequencies. The two components of frequency can be separated at the other end of the telephone line by using standard filtering techniques.

While the principles of the invention have been made clear in an illustrative embodiment, it is obvious that many modifications may be made by those skilled in the art which are particularly adapted for specific environments and operating requirements without departing from these principles. Thus, the invention is to be construed as being limited only by the spirit and scope of the appended claims.

What is claimed is:

1. Apparatus for converting the position of a sensor into an electrical signal comprising:
    a plurality of spaced-apart conductors;
    means for providing discrete voltage pulses to each of the said conductors sequentially to generate a time-varying electrostatic field;
    sensor means for sensing the varying electrostatic field generated by said conductors and for generating an output signal therefrom;
    means coupled to said sensor means and said means for providing voltage pulses for receiving said output signal from said sensor means and at least one of said voltage pulses and for generating therefrom an analog signal representative of the position of said sensor means relative to said plurality of conductors, including;
    a detecting circuit coupled to said sensor means for providing an output when the output signal amplitude of said sensor means exceeds a predetermined level,
    means for generating a pulse signal having a duration representative of the time interval between a voltage pulse provided to a particular one of said spaced-apart conductors and the output signal from said detecting circuit, said time interval corresponding to the position of said sensor means relative to said spaced-apart conductors, and
    means for integrating said pulse signal.

2. The apparatus of claim 1 wherein said means for providing said electrical voltage pulses comprises:
    an electronic digital counting circuit capable of counting through a series of count states of a number at least equal to the number of said spaced-apart conductors;
    means for stepping said counter through said count states continuously and repetitively; and
    means for coupling said counting circuit and said spaced-apart conductors to provide each of such conductors with a voltage pulse corresponding to a unique state of said counting circuit.

3. The apparatus of claim 2 wherein said means for coupling said counting circuit and said spaced-apart conductors includes gating circuit means.

4. The apparatus of claim 1 wherein said spaced-apart conductors form a part of a writing table.

5. The apparatus of claim 1 further comprising a writing instrument, said sensor means forming a part of said writing instrument.

6. The apparatus of claim 1 wherein said means for generating a pulse signal includes latch means coupled to said detecting circuit and said sensor means, said latch means having a first and second state and being driven to its first state by said voltage pulse and to its second state by the output signal of said detecting circuit.

7. Apparatus for converting the position of a sensor into an electrical signal comprising:
    a first set of parallel spaced-apart conductors;
    a second set of parallel spaced-apart conductors angularly disposed with respect to said first set of conductors to form a two-dimensional grid of conductors;
    means for providing discrete voltage pulses sequentially to each of the conductors of said first and second set of conductors to generate a time-varying electrostatic field;
    sensor means for sensing the varying electrostatic field generated by said conductors and for generating an output signal therefrom;
    first means coupled to said sensor means and said means for providing discrete voltage pulses for receiving an output signal from said sensor means and a discrete voltage pulse provided to a first of said first set of conductors for generating therefrom a first analog signal representation of the position of said sensor means relative to said first set of parallel spaced apart conductors; and
    second means coupled to said sensor means and said means for providing discrete voltage pulses for receiving an output signal from said sensor means and a discrete voltage pulse provided to a first of said second set of conductors for generating therefrom a second analog signal representative of the position of said sensor means relative to said second set of parallel spaced apart conductors 8. The apparatus of claim 7 wherein said grid of conductors is parallel to the surface of a writing table.

9. The apparatus of claim 7 wherein said second set of conductors is orthogonal to said first set of conductors.

10. The apparatus of claim 7 wherein said means for providing said voltage pulses alternately provides pulses sequentially to said first set of conductors and sequentially to said second set of conductors.

11. The apparatus of claim 7 wherein said first means and said second means each constitutes:
   a latch circuit means, and
   integrating means for receiving and integrating an output of said latch circuit means.

12. The apparatus of claim 7 wherein there is included:
   a first voltage controlled oscillator for producing responsive to said first analog signal, a first oscillating signal having a frequency of oscillation representative of said first analog signal,
   a second voltage controlled oscillator for producing responsive to said second analog signal, a second oscillating signal having a frequency of oscillation representative of said second analog signal,
   means for combining said first and second oscillator signals for transmission.

* * * * *